(12) United States Patent
Lin et al.

(10) Patent No.: US 7,948,364 B2
(45) Date of Patent: May 24, 2011

(54) METHOD AND APPARATUS FOR DETERMINING IDENTIFIABLE TIRE POSITION LOCATION IN A TIRE PRESSURE MONITORING SYSTEM

(75) Inventors: Xing Ping Lin, Orchard Lake, MI (US); David L Juzswik, Commerce, MI (US); Michael G. Oszust, Davisburg, MI (US)

(73) Assignees: TRW Automotive U.S. LLC, Farmington Hills, MI (US); Michelin Recherche et Technique S.A., Granges-Paccot (CH)

( * ) Notice: Subject to any disclaimer, the term of this patent is extended or adjusted under 35 U.S.C. 154(b) by 376 days.

(21) Appl. No.: 12/300,215

(22) PCT Filed: May 17, 2007

(86) PCT No.: PCT/US2007/011832
§ 371 (c)(1),
(2), (4) Date: Nov. 10, 2008

(87) PCT Pub. No.: WO2007/136701
PCT Pub. Date: Nov. 28, 2007

(65) Prior Publication Data
US 2009/0179747 A1 Jul. 16, 2009

Related U.S. Application Data

(60) Provisional application No. 60/800,980, filed on May 17, 2006.

(51) Int. Cl.
*B60C 23/00* (2006.01)
(52) U.S. Cl. ........ 340/442; 340/445; 340/447; 73/146.5
(58) Field of Classification Search .................. 340/442
See application file for complete search history.

(56) References Cited

U.S. PATENT DOCUMENTS

| | | | |
|---|---|---|---|
| 6,278,363 B1 | 8/2001 | Bezek et al. | |
| 6,417,766 B1 | 7/2002 | Starkey | |
| 6,489,888 B1 | 12/2002 | Honeck et al. | |
| 6,667,687 B1 | 12/2003 | DeZorzi | |
| 6,788,193 B2 | 9/2004 | King et al. | |
| 6,879,252 B2 | 4/2005 | DeZorzi et al. | |
| 2003/0145650 A1 | 8/2003 | Juzswik et al. | |
| 2003/0197603 A1 | 10/2003 | Stewart et al. | |
| 2006/0214780 A1 | 9/2006 | Mathias et al. | |

FOREIGN PATENT DOCUMENTS

WO    WO 2005/018963 A1    3/2005

*Primary Examiner* — Donnie L Crosland
(74) *Attorney, Agent, or Firm* — Tarolli, Sundheim, Covell & Tummino LLP

(57) ABSTRACT

A method for identifying tire location including the steps of transmitting a low frequency signal at different power levels and receiving radio frequency identification signals. Tire identification and location based on low frequency power level for two tire transmitters is determined. Radio frequency signals from two different tire transmitters are received and tire identification and location are determined based on radio frequency signal strength.

8 Claims, 3 Drawing Sheets ately, mounted within the tire for sensing a condition of its associated tire such as pressure, temperature, etc. Each of the tires 12, 14, 16, and 18 also includes an associated low frequency ("LF") receiver and radio frequency ("RF") transmitter ("LFR/RFT") 32, 34, 36, 38, respectively, connected to its associated sensor 22, 24, 26, and 28, respectively, and mounted within the tire. Each of the LFR/RFT circuits are adapted to respond to a received LF initiating signal and, in response thereto, transmit an RF signal having at least an associated unique tire

METHOD AND APPARATUS FOR DETERMINING IDENTIFIABLE TIRE POSITION LOCATION IN A TIRE PRESSURE MONITORING SYSTEM

RELATED APPLICATION

This application claims priority from U.S. provisional patent application Ser. No. 60/800,980, filed on May 17, 2006, the subject matter of which is incorporated herein by reference.

TECHNICAL FIELD

The present invention is directed to a tire pressure monitoring system and, more particularly, to a method and apparatus for associating each tire based monitoring device with a tire location on the vehicle.

BACKGROUND OF THE INVENTION

Tire pressure monitoring systems having an associated tire based pressure sensor and transmitter in each tire are known. The tire based sensor inside a tire senses the pressure of its associated tire and transmits the sensed pressure information to a vehicle mounted receiver. The vehicle mounted receiver is connected to a display that displays a warning to the vehicle operator when an under-inflated tire condition occurs.

Each tire based transmitter within a tire has a unique identification code that is transmitted as part of the tire transmission signal. The vehicle based receiver can be programmed with the identification codes and the tire associated tire locations so as to associate and display improper tire condition information appropriately.

SUMMARY OF THE INVENTION

According to an example embodiment of the present invention, a method for identifying tire location including the steps of transmitting a low frequency signal at different power levels and receiving radio frequency identification signals. Tire identification and location based on low frequency power level for two tire transmitters is determined. Radio frequency signals from two different tire transmitters are received and tire identification and location are determined based on radio frequency signal strength.

In accordance with another example embodiment of the present invention, a method is provided for identifying tire transmitter location in a tire pressure monitoring system for a vehicle comprising the steps of transmitting a first low powered, low frequency signal adjacent a first tire location, monitoring for a transmitted identification return signal from said first tire location, storing said monitored identification return signal from said first tire location, and transmitting a second higher powered, low frequency signal adjacent the first tire location. The method further includes the steps of monitoring for a transmitted identification return signal from a second tire location, storing said monitored identification return signal from said second tire location, monitoring for periodic transmissions of identification signal from a third and forth tire location from the first tire location, and determining signal strength of the monitored periodic transmissions of identification signal from a third and forth tire location from the first tire location and associated tire location and signal identification of the third and forth tire location based on signal strength.

In accordance with another example embodiment of the present invention, an apparatus is provided for identifying tire location including a transmitter for transmitting a low frequency signal at different power levels. A receiver receives radio frequency identification signals. A controller determines tire identification and location based on radio signal received in response to the low frequency power level signals and determines tire identification and location based on radio frequency signal strength. The transmitter and receiver may be on a single integrated circuit located at one tire location.

In accordance with yet another example embodiment of the present invention, a tire pressure monitoring system for a vehicle is provided comprising a low powered transmitter mounted adjacent a first tire location for transmitting adjustable powered, low frequency signals. A monitor monitors for a transmitted identification signals from tire locations and a memory stores said monitored identification signals from said tire locations. The system further includes a circuit for determining signal strength of monitored transmissions of identification signal from the tire locations, and a controller for associating tire location in response to signal returns and signal strength of transmissions of identification signals from the tire locations.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
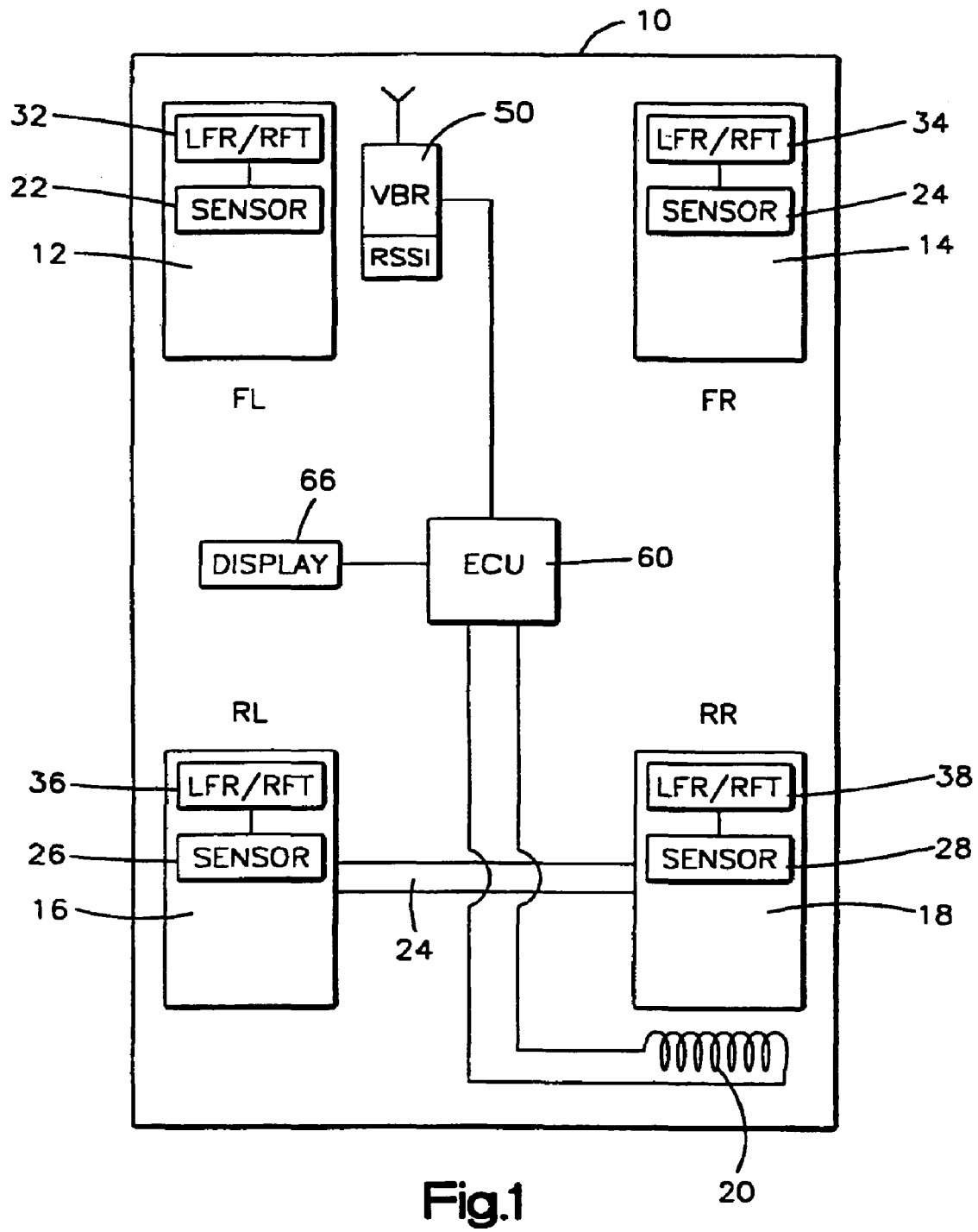
FIG. 1 is a schematic block diagram of a vehicle including an example embodiment of the present invention.

Referring to FIG. 1, a vehicle 10, according to an example embodiment of the present invention, includes front left tire 12, front right tire 14, rear left tire 16, and rear right tire 18 at vehicle tire corner locations FL, FR, RL, and RR, respectively. A single low frequency ("LF") initiator coil 20 is placed in one of the vehicle's wheel wells at, for example, the right rear wheel well behind the right rear tire, as shown in FIG. 1. The position of the LF initiator 20 is such that a substantially different distance from the LF initiator 20 is achieved between two tire locations. In accordance with one example embodiment, the LF initiator coil 20 is aligned to be parallel with the rear axel 24 of the vehicle 10 connecting the two rear wheels 16, 18.

Each of the tires 12, 14, 16, and 18 includes an associated tire condition sensor 22, 24, 26, 28, respectively, mounted within the tire for sensing a condition of its associated tire such as pressure, temperature, etc. Each of the tires 12, 14, 16, and 18 also includes an associated low frequency ("LF") receiver and radio frequency ("RF") transmitter ("LFR/RFT") 32, 34, 36, 38, respectively, connected to its associated sensor 22, 24, 26, and 28, respectively, and mounted within the tire. Each of the LFR/RFT circuits are adapted to respond to a received LF initiating signal and, in response thereto, transmit an RF signal having at least an associated unique tire identification information code, and any other desired information for that tire such as measured pressure and/or temperature as sensed by its associated sensor.

A vehicle based receiver 50 ("VBR") is mounted in the vehicle 10 at a location spaced near one of the front tires FL or FR and spaced from the LF initiator 20. The RF receiver 50 is adapted to receive RF signals generated from the tire transmitters 32, 34, 36, and 38 and includes circuitry to determine the strength of the received RF signals known as received signal strength indication ("RSSI") circuitry.

An electronic control unit ("ECU") 60 is provided and controllably connected to the LF initiator coil 20 for controlling the transmission of LF initiation signals. The ECU not only controls the timing of the LF initiation signals but also the signal strength. Signal strength is controlled either via amplitude control or frequency control.

The ECU 60 is also connected to the vehicle based receiver 50 and receives signals from the RF transmitters 32, 34, 36, 38 having the tire identification codes and sensor information such as sensed tire pressure and temperature. The ECU 60 is connected to a display device 66 and displays any alert condition to the vehicle operator of a sensed tire condition out of specification. One skilled in the art will appreciate that continuous sensed data could also be displayed.

For the display of each tire condition data whether alert or continuous data, the ECU 60 must learn the tire identification code associated with each tire pressure monitoring system within each tire at each tire position. To accomplish this learning of identification codes associated with each tire pressure monitoring system (the sensor plus LFR/RFT) within the tire at each tire position, a combination LF and RF plus RSSI technique is used.

It should be appreciated that the axis of the initiator coil 20 could be different from that shown in FIG. 1 to allow a different pair of tire mounted sensors to respond. In accordance with the example embodiment, with the axis orientation as shown, the LF initiator 20 is controlled by the ECU 60 to provide a low power output LF signal that has a field strength sufficient that the LF receiver in the right rear tire 18 can receive the signal. In response to receiving the LF signal, the LFR/RFT circuit 38 responds with an RF response signal that includes that tire's associated unique identification ("ID") code and could include additional information such as tire pressure information and/or tire temperature. This RF response signal is received by the receiver 50 and processed by the ECU 60, to verify that the "ID" code is applicable to this vehicle 10. Since the ECU knows that it just initiated tire 18 and the code is valid for this vehicle 10, the code it just received is the ID code corresponding for tire 18. It then stores that code association in memory for later use.

The ECU then interrogates via LF coil 20 an LF signal with a second stronger LF signal designed to be of sufficient signal strength that the LF receiver within tire 16 can receive the second LF signal. The signal strength can be increased either through amplitude or frequency. In response to receiving the LF interrogation signal, the LFR/RFT circuit 36 responds with an RF response signal that includes that tire's associated unique identification ("ID") code and could include additional information such as tire pressure information and/or tire temperature. This RF response signal is received by the receiver 50 and processed by the ECU 60 in a similar manner, checking validity. The ECU will receive two ID signals in response to this initiation, one from tire 18 and one from tire 16. Since it knows the ID from tire 18, it can ignore that ID and it knows that the other ID corresponds to that of tire 16. It then stores that code association in memory for tire 16 for later use.

During normal operation of the vehicle 10, the tire pressure monitoring systems (sensors plus LFR/RFT) in the tires 12 and 14 will periodically transmit RF signals having their associated unique ID codes and sensed tire condition information. The vehicle based receiver 50 receives each of the RF signals so transmitted and makes a determination using its RSSI circuitry which RF signal is stronger. The ECU 60 then correlates the stronger RF signal with the transmitted ID code and stores that with the associated tire location. If the receiver 50 is closest to tire 12, the code for closed tire corresponds to tire 12 and the other code corresponds to tire 14. The received signal strength from the two initiated tires 16 and 18 is not utilized in the location association of tires 12 and 14.

System design requires that adequate margin be built into the system to allow for RF attenuations, and resulting RSSI changes. Such attenuations may result from component variation, but are primarily the result of tire rotation effects, vehicle modifications such as the use of different tire construction, weather, and other RF interference conditions. These attenuation variations may exceed the ranges of the RSSI circuitry capability. The vehicle mounted receiver needs to optimize receive circuit and RSSI range to give the largest received signal difference between the two tire sensor systems being located.

RSSI difference optimization is possible by two methods. The first method is for the vehicle based receiver to scale the RSSI allowing measurement of values that were out of RSSI measurement range. To bring RSSI values into range, so the difference can be measured, can be accomplished by increasing or decreasing the vehicle based receiver sensitivity, depending if the RSSI value was below or above the RSSI range, respectively. After location is determined, the vehicle based receiver 50 sensitivity may be increased back to maximum value to increase the RF link margin to allow for variations due to tire rotation and RF interference desensitization.

The second RSSI difference optimization method is using vehicle tire sensors that include a speed sensor, such as an accelerometer. Upon the tire's achieving a predetermined speed threshold, the RF transmitter RFT would enter a timed period in which RF signals are transmitted at a reduced signal level, but at a higher transmission rate.

Figure 2:
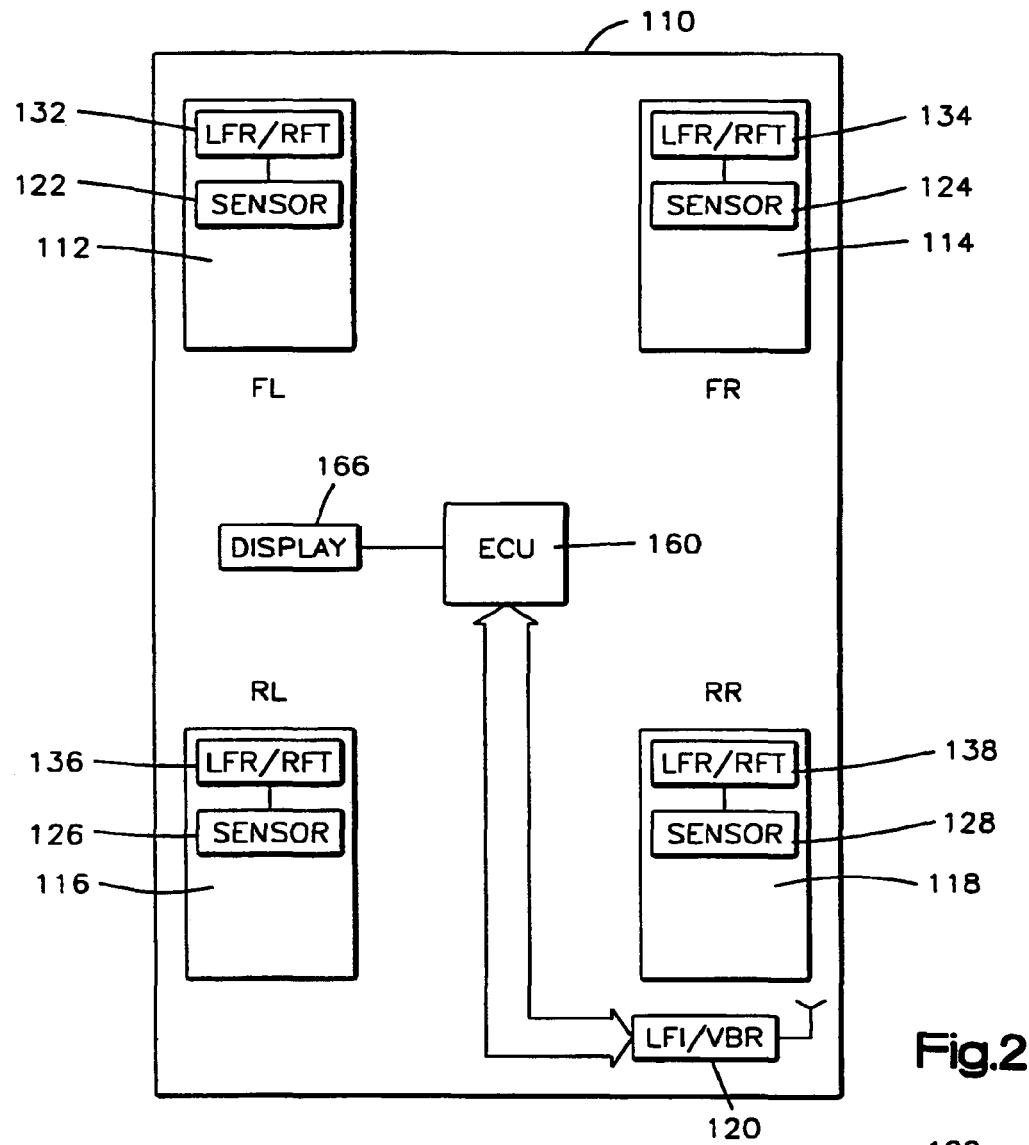
FIG. 2 is a schematic block diagram of a vehicle including another example embodiment of the present invention.
Figure 3:
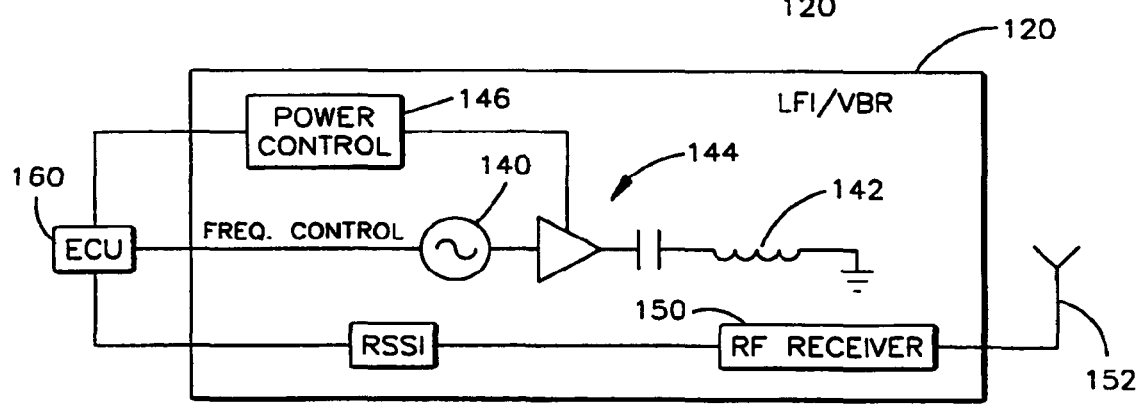
FIG. 3 is a schematic block diagram of a portion of the invention shown in FIG. 2 showing the LF initiator and the vehicle based receiver in more detail.

Referring to FIGS. 2 and 3, another example embodiment of the present invention is shown in which a vehicle 110 includes front left tire 112, front right tire 114, rear left tire 116, and rear right tire 118 at vehicle tire corner locations FL, FR, RL, and RR, respectively. An integrated circuit 120 having a low frequency initiator ("LFI") circuit and a vehicle based receiver ("VBR") circuit is mounted in one of the vehicle's wheel wells at, for example, the right rear wheel well behind the right rear tire, as shown in FIG. 2. The position of the LFI/VBR circuit 120 is such that each vehicle tire is located a different distance there from. In accordance with this example embodiment, the LFI/VBR circuit 120 has an internal LF coil aligned to be parallel with the rear axel (not shown) of the vehicle 110 connecting the two rear wheels 116, 118.

Each of the tires 112, 114, 116, and 118 includes an associated tire condition sensor 122, 124, 126, 128, respectively, mounted within the tire for sensing a condition of its associated tire such as pressure, temperature, etc. Each of the tires 112, 114, 116, and 18 also includes an associated low frequency ("LF") receiver and radio frequency ("RF") transmitter ("LFR/RFT") 132, 134, 136, 138, respectively, connected to its associated sensor 122, 124, 126, and 128, respectively, and mounted within the tire. Each of the LFR/RFT circuits are adapted to respond to a received LF initiating signal and, in response thereto, transmit an RF signal having at least an associated unique tire identification information code, and any other desired information for that tire such as measured pressure and/or temperature as sensed by its associated sensor.

The vehicle based receiver circuit of the integrated circuit 120 is adapted to receive RF signals generated from the tire transmitters 132, 134, 136, and 138 and includes received signal strength indication ("RSSI") circuitry to determine the strength of the received RF signals.

An electronic control unit ("ECU") 160 is provided and controllably connected to the LFI/VBR circuit 120 for controlling the transmission of LF initiation signals and receipt of RF signals. The ECU not only controls the timing of the LF initiation signals but also the signal strength. Signal strength is controlled either via amplitude control or frequency control.

The ECU 160 is also processes the received RF signals having the tire identification codes and sensor information such as sensed tire pressure and temperature. The ECU 160 is connected to a display device 166 and displays any alert condition to the vehicle operator of a sensed tire condition out of specification. One skilled in the art will appreciate that continuous sensed data could also be displayed.

For the display of tire condition data whether alert or continuous data, the ECU 160 must learn the tire identification code associated with each tire pressure monitoring system within each tire. To accomplish this learning of identification codes associated with each tire pressure monitoring system (the sensor plus LFR/RFT) within the tire, a combination LF and RF plus RSSI technique is used.

FIG. 3 shows the low frequency initiator and vehicle based receiver circuit functions of the integrated circuit 120 in more detail. The ECU 160 controls a frequency controlled oscillator having an output connected to an LF antenna 142 through a drive circuit 144. As mentioned, the LF antenna in accordance with the example embodiment is aligned with the rear axle of the vehicle. The ECU 160 controls the gain of the drive circuit 144 via a power control arrangement 146. Power of the LF initiation signal or interrogation signal is controlled either via amplitude control or frequency control. An RF receiver circuit 150 is connected to an RF antenna 152. The output of the RF receiver is connected to an RSSI circuit. The output of the RSSI circuit is connected to the ECU 160.

The LF initiator circuit portion of the integrated circuit 120 is controlled by the ECU 160 to provide a low power output LF signal that has a field strength sufficient that only the LF receiver in the right rear tire 118 can receive the signal. In response to receiving the LF initiation signal, the LFR/RFT circuit 138 responds with a RF response signal that includes that tire's associated unique identification ("ID") code and could include additional information such as tire pressure information and/or tire temperature. This RF response signal is received by the vehicle based receiver circuit portion of the integrated circuit 120 and processed by the ECU 160. Since the ECU knows that it just initiated tire 118, the code it just received is the ID code corresponding for tire 118. It then stores that code in its internal memory for later use.

The ECU 160 then interrogates via LFI circuit portion of the integrated circuit 120 an LF signal with a second stronger LF signal designed to be of sufficient signal strength that the LF receiver within tire 116 can receive the second LF signal. The signal strength can be increased either through amplitude or frequency. In response to receiving the LF interrogation signal, the LFR/RFT circuit 136 responds with an RF response signal that includes that tire's associated unique identification ("ID") code and could include additional information such as tire pressure information and/or tire temperature. This RF response signal is received by the vehicle based receiver circuit of the integrated circuit 120 and processed by the ECU 160. The ECU will receive two ID signals in response to this initiation, one from tire 118 and one from tire 116. Since it knows the ID from tire 118, it can ignore that ID and it knows that the other ID corresponds to that of tire 118. It then stores that code in its internal memory for tire for later use.

During normal operation of the vehicle 110, the tire pressure monitoring systems (sensors plus LFR/RFT) in the tires 112 and 114 will periodically transmit RF signals having their associated unique ID codes and sensed tire condition information. The vehicle based receiver circuit of integrated circuit 120 receives each of the RF signals so transmitted and makes a determination using its RSSI circuitry which RF signal is stronger. The ECU 160 then correlates the stronger RF signal with the transmitted ID code and stores that with the associated tire location. If the vehicle based receiver circuit of the integrated circuit is closest to tire 114, the code for closest tire corresponds to tire 114 and the other code corresponds to tire 112.

RSSI difference optimization is possible using vehicle tire sensors that include a speed sensor, such as an accelerometer. Upon the tire's achieving a predetermined speed threshold, the RF transmitter RFT would enter a timed period in which RF signals are transmitted at a reduced signal level, but at a higher transmission rate.

Figure 4:
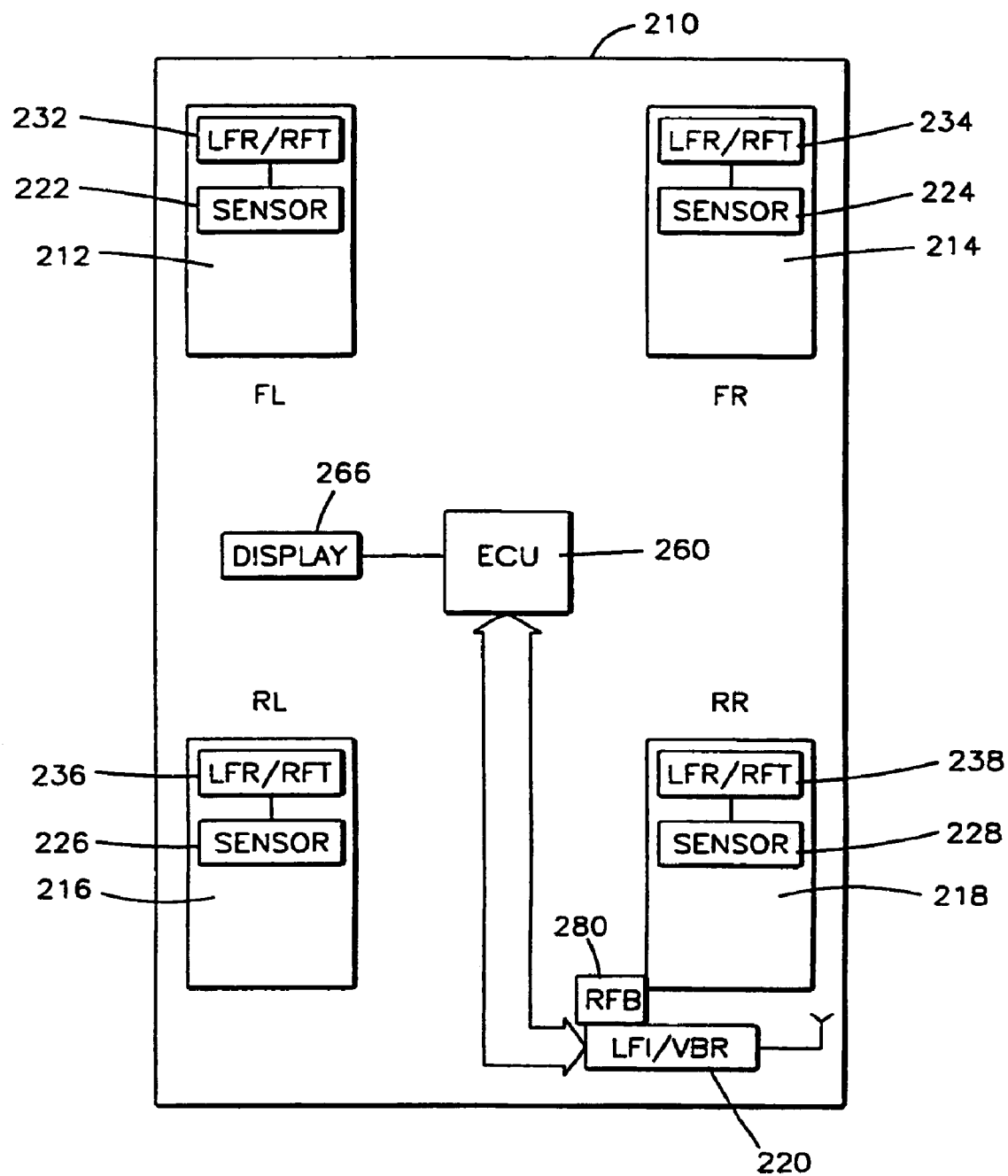
FIG. 4 is a schematic block diagram of a vehicle including yet another example embodiment of the present invention.

Referring to FIG. 4, yet another example embodiment of the present invention is shown in which a vehicle 210 includes front left tire 212, front right tire 214, rear left tire 216, and rear right tire 218 at vehicle tire corner locations FL, FR, RL, and RR, respectively. An integrated circuit 220 having a low frequency initiator ("LFI") circuit and a vehicle based receiver ("VBR") circuit is mounted in one of the vehicle's wheel wells at, for example, the right rear wheel well behind the right rear tire, as shown in FIG. 4. The position of the LFI/VBR circuit 220 is such that each vehicle tire is located a different distance therefrom. In accordance with this example embodiment, the LFI/VBR circuit 220 has an internal LF coil aligned to be parallel with the rear axel (not shown) of the vehicle 210 connecting the two rear wheels 216, 218.

Each of the tires 212, 214, 216, and 218 includes an associated tire condition sensor 222, 224, 226, 228, respectively, mounted within the tire for sensing a condition of its associated tire such as pressure, temperature, etc. Each of the tires 212, 214, 216, and 218 also includes an associated low frequency ("LF") receiver and radio frequency ("RF") transmitter ("LFR/RFT") 232, 234, 236, 238, respectively, connected to its associated sensor 222, 224, 226, and 228, respectively, and mounted within the tire. Each of the LFR/RFT circuits are adapted to respond to a received LF initiating signal and, in response thereto, transmit an RF signal having at least an associated unique tire identification information code, and any other desired information for that tire such as measured pressure and/or temperature as sensed by its associated sensor.

The vehicle based receiver circuit of the integrated circuit 220 is adapted to receive RF signals generated from the tire transmitters 232, 234, 236, and 238 and includes received signal strength indication ("RSSI") circuitry to determine the strength of the received RF signals.

An electronic control unit ("ECU") 260 is provided and controllably connected to the LFI/VBR circuit 220 for controlling the transmission of LF initiation signals and receipt of RF signals. The ECU not only controls the timing of the LF initiation signals but also the signal strength. Signal strength is controlled either via amplitude control or frequency control.

The ECU 260 is also processes the received RF signals having the tire identification codes and sensor information such as sensed tire pressure and temperature. The ECU 260 is connected to a display device 266 and displays any alert condition to the vehicle operator of a sensed tire condition out of specification. One skilled in the art will appreciate that continuous sensed data could also be displayed.

For the display of tire condition data whether alert or continuous data, the ECU 260 must learn the tire identification code associated with each tire pressure monitoring system within each tire. To accomplish this learning of identification codes associated with each tire pressure monitoring system (the sensor plus LFR/RFT) within the tire, a combination LF and RF plus RSSI technique is used.

The LF initiator circuit portion of the integrated circuit 220 is controlled by the ECU 260 to provide a low power output LF signal that has a field strength sufficient that only the LF receiver in the right rear tire 218 can receive the signal. In response to receiving the LF initiation signal, the LFR/RFT circuit 238 responds with a RF response signal that includes that tire's associated unique identification ("ID") code and could include additional information such as tire pressure information and/or tire temperature. This RF response signal is received by the vehicle based receiver circuit portion of the integrated circuit 220 and processed by the ECU 260. Since the ECU knows that it just initiated tire 118, the code it just received is the ID code corresponding for tire 218. It then stores that code in its internal memory for later use.

The ECU 260 then interrogates via LFI circuit portion of the integrated circuit 220 an LF signal with a second stronger LF signal designed to be of sufficient signal strength that the LF receiver within tire 216 can receive the second LF signal. The signal strength can be increased either through amplitude or frequency. In response to receiving the LF interrogation signal, the LFR/RFT circuit 236 responds with an RF response signal that includes that tire's associated unique identification ("ID") code and could include additional information such as tire pressure information and/or tire temperature. This RF response signal is received by the vehicle based receiver circuit of the integrated circuit 220 and processed by the ECU 260. The ECU will receive two ID signals in response to this initiation, one from tire 218 and one from tire 216. Since it knows the ID from tire 218, it can ignore that ID and it knows that the other ID corresponds to that of tire 218. It then stores that code in its internal memory for tire for later use.

During normal operation of the vehicle 210, the tire pressure monitoring systems (sensors plus LFR/RFT) in the tires 212 and 214 will periodically transmit RF signals having their associated unique ID codes and sensed tire condition information. The vehicle based receiver circuit of integrated circuit 220 receives each of the RF signals so transmitted and makes a determination using its RSSI circuitry which RF signal is stronger. The ECU 260 then correlates the stronger RF signal with the transmitted ID code and stores that with the associated tire location. If the vehicle based receiver circuit of the integrated circuit is closest to tire 214, the code for closest tire corresponds to tire 214 and the other code corresponds to tire 212.

An RF blocking ("RFB") structure 280 is provided located between the vehicle based receiver 220 and the front left tire 212 so as to reduce the amplitude of the RF transmitted signal from the RF transmitter 232 so as to make a larger difference in the two signals between the FL and FR tires as seen by the vehicle based receiver 220 circuitry RSSI.

RSSI difference optimization is possible using vehicle tire sensors that include a speed sensor, such as an accelerometer. Upon the tire's achieving a predetermined speed threshold, the RF transmitter RFT would enter a timed period in which RF signals are transmitted at a reduced signal level, but at a higher transmission rate.

From the above description of the invention, those skilled in the art will perceive improvements, changes and modifications. Such improvements, changes and modifications within the skill of the art are intended to be covered by the appended claims.

Having described the invention, the following is claimed:

1. A method for identifying tire location comprising the steps of:
    transmitting a low frequency signal at different power levels and receiving radio frequency identification signals;
    determining tire identification and location based on low frequency power level for two tire transmitters; and
    receiving radio frequency signals from two different tire transmitters and determining tire identification and location based on radio frequency signal strength.

2. A method for identifying tire transmitter location in a tire pressure monitoring system for a vehicle comprising the steps of:
    transmitting a first low powered, low frequency signal adjacent a first tire location;
    monitoring for a transmitted identification return signal from said first tire location;
    storing said monitored identification return signal from said first tire location;
    transmitting a second higher powered, low frequency signal adjacent the first tire location;
    monitoring for a transmitted identification return signal from a second tire location;
    storing said monitored identification return signal from said second tire location;
    monitoring for periodic transmissions of identification signal from a third and forth tire location from the first tire location; and
    determining signal strength of the monitored periodic transmissions of identification signal from a third and forth tire location from the first tire location and associated tire location and signal identification of the third and forth tire location based on signal strength.

3. The method of claim 2 wherein the step of monitoring for a transmitted identification return signal from said first tire location includes monitoring for a radio frequency signal.

4. The method of claim 2 further including the step of sensing tire pressure information and each tire and transmitting the associated pressure information with the tire's associated identification signal and further including the step of displaying tire pressure information.

5. An apparatus for identifying tire location comprising:
    a transmitter for transmitting a low frequency signal at different power levels;
    a receiver for receiving radio frequency identification signals; and
    a controller for determining tire identification and location based on radio signal received in response to the low frequency power level signals determining tire identification and location based on radio frequency signal strength.

6. The apparatus of claim 5 wherein the transmitter and the receiver are on an integrated circuit.

7. The apparatus of claim 6 wherein the integrated circuit is mounted at one tire location.

8. A tire pressure monitoring system for a vehicle comprising:
- a low powered transmitter mounted adjacent a first tire location for transmitting adjustable powered, low frequency signals;
- a monitor for monitoring for a transmitted identification signals from tire locations;
- a memory for storing said monitored identification signals from said tire locations;
- a circuit for determining signal strength of monitored transmissions of identification signal from the tire locations; and
- a controller for associating tire location in response to signal returns and signal strength of transmissions of identification signals from the tire locations.

* * * * *